United States Patent
Nickell

[15] 3,660,072
[45] May 2, 1972

[54] RIPENING OF SUGARCANE BY USE OF CERTAIN QUATERNARY AMMONIUM HALIDES

[72] Inventor: Louis G. Nickell, Honolulu, Hawaii

[73] Assignee: Hawaiian Sugar Planters Association, Honolulu, Hawaii

[22] Filed: May 22, 1970

[21] Appl. No.: 39,925

[52] U.S. Cl. .................................................71/121, 71/76
[51] Int. Cl. .........................................................A01n 9/20
[58] Field of Search ................................................71/121, 76

[56] References Cited

UNITED STATES PATENTS 3,482,961  12/1969  Nickell et al. ............................71/121
3,493,361  2/1970  Nickell et al. ............................71/121

*Primary Examiner*—Lewis Gotts
*Assistant Examiner*—Catherine L. Mills
*Attorney*—Burns, Doane, Swecker & Mathis

[57] ABSTRACT

Sucrose yield of sugarcane is increased by treating sugarcane a few weeks prior to harvest with a quaternary ammonium salt such as a higher alkyltrimethylammonium bromide or chloride wherein the higher alkyl group contains between about 8 and 20 carbon atoms.

6 Claims, No Drawings

RIPENING OF SUGARCANE BY USE OF CERTAIN QUATERNARY AMMONIUM HALIDES

BACKGROUND OF THE INVENTION

Considerable progress has been made in the last several years in increasing the sugar yield of sugarcane by improving the varieties being planted, enriching the soil with fertilizers and irrigating the soil in climates which do not naturally provide sufficient moisture for optimum plant growth. More recent efforts in improving sugar production have increasingly turned toward the use of chemicals in modifying and controlling the physiological processes of sugarcane, particularly in ripening prior to harvest. See U.S. Pat. Nos. 3,224,865; 3,245,775; 3,291,592; 3,482,958; 3,482,959; 3,482,961; and 3,493,361.

With some compounds previously suggested for this purpose, there has been some concern about their resistance to breakdown in the plant and their persistence in the soil when the intended use of the sugar is nutritive, as opposed to industrial (e.g., in fermentation processes). Consequently, extensive efforts continue to be made in searching for effective chemical agents that can be used to modify the ripening of sugarcane so as to increase the sucrose yield therefrom.

Generally speaking, chemicals selected for evaluation have been of types which have been previously found active in work with other plants as plant hormones, herbicides or inhibitors of growth of terminal buds, or active in killing the spindle of cane upon topical micro-application, etc. However, among the compounds heretofore found to be useful for such other special purposes, very few have been found effective in controlling the ripening of sugarcane in the desirable manner. No relationship has been recognized to date between the chemical structure of such compounds and (a) their phytotoxic effects, (b) their physiological effects on the morphogenetic development of the plant, and (c) their activity in having positive effects on ripening. In other words, the effectiveness of a compound in controlling the ripening of sugarcane and thereby increasing sugar yield remains essentially unpredictable, and the search for suitable agents continues to be fundamentally empirical.

A review of the literature discloses that some work has been done using surfactants to increase the crystallization rate of cane sugar and in the purification of sugar juices. See Ramaiah et al., Proceedings, 29th Annual Convention of the Sugar Tech. Assoc. of India, 1961, Part II. Cetyl trimethylammoniumbromide (CTAB) is a well known surfactant and quaternary ammonium germicide. Studies on the toxicity of the quaternary ammonium germicides are few, but Finnegan et al., "-Toxicity of Quaternaries," Soap and Sanitary Chemicals, Volume 30, No. 2, Page 147, 1954, indicate that there is no hazard to humans when as much as 200 ppm of quaternary ammonium germicides are used in dishwashing. Also, since concentrations as little as 10–20 ppm produce a very bitter and astringent taste in food products, any potentially toxic concentrations are readily detectable. Salmeron et al, in Biological Abstracts, Volume 35: 4253 (1960), indicate that treatment of pine seedlings with an aqueous solution of CTAB resulted in an increase of 20% in the size of the nuclei of the meristematic cells of the young seedlings. No reference has been found to indicate that CTAB and related quaternary ammonium compounds have ever been applied to sugarcane for any purpose.

It is an object of this invention to provide a new agent for controlling the ripening of sugarcane. A more specific object is to increase the sucrose yield of sugarcane by chemically treating it during its final ripening stages prior to harvest without introducing substantial toxicological hazards, and preferably without causing any visible damage to the cane plant such as drying of the spindle or other leaf.

Still more specifically, it is an object to increase the sucrose yield of sugarcane by treating it prior to harvest with a chemical agent which is sufficiently stable to provide the desired effect over a period of several weeks and thus give adequate operational flexibility, but which has a relatively low degree of persistence and is susceptible to autodecomposition or decomposition by soil bacteria. Compounds which increase the sucrose content of sugarcane only temporarily over a period of two or three weeks after application and then result in a substantial decrease are generally not desirable for the intended purpose.

SUMMARY OF INVENTION

It has now been discovered that excellent results in increasing the sucrose yield of sugarcane can be obtained by treating the younger, growing parts of the cane stalk a few weeks before harvest with a quaternary amine compound wherein three of the four radicals attached to the amine nitrogen atom are methyl groups, and the fourth is a long chain alkyl group of from eight to 20 carbon atoms. The preferred usage form in this invention is a mixture containing the quaternary amine salt in an aqueous solution or suspension utilizing one or a combination of nonionic surface active agents. Quaternary amines corresponding to the formula

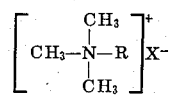

wherein R is an alkyl from eight to 20 carbon atoms and X is chlorine or bromine can be used in carrying out the invention. Cetyltrimethylammonium bromide is representative. Other suitable compounds include: octyltrimethylammonium bromide, dodecyltrimethylammonium chloride, dodecyltrimethylammonium bromide, tetradecyltrimethylammonium chloride, cetyltrimethylammonium chloride, eicosyltrimethylammonium bromide. Bromine salts of the above formula wherein the long chain alkyl group contains from 12 to 16 carbon atoms are preferred.

In accordance with this invention the sugarcane crop is treated with CTAB or one of the other quaternary ammonium salts heretofore indicated, or with a composition containing one or more of such compounds, at any time from 2 to 10 weeks before harvest, the preferred time for treatment being between about 3 and 8 weeks prior to harvest.

Good results are obtained when the sugarcane crop is treated at a rate in the range of from about 1 to about 4 pounds of the kind of quaternary amine salt referred to above per acre of sugarcane, although higher rates of up to about 10 pounds or more per acre as well as rates lower than 1 pound per acre can be used. The optimum amount will vary somewhat depending on the specific treating composition applied, environmental conditions, time of year, age of cane and in some cases the specific variety of cane being treated, but can be readily determined for each particular case by preliminary testing.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane. In preparing suitable liquid compositions, surface active agents of the type described for instance in U.S. Pat. No. 3,224,865, column 2, lines 61–66 or in U.S. Pat. No. 3,245,775, column 2, lines 57–64 are convenient to use. The preferred surfactants for use in liquid compositions of the present invention are those of the non-ionic type, e.g., alkyl phenoxy poly (ethylene-oxy) ethanols such as adducts of nonylphenol and ethylene oxide; trimethyl nonyl polyethylene glycol ethers; polyethylene oxide adducts of fatty and resin acids; and long chain alkyl mercaptan adducts with ethylene oxide.

With the type of boom-spray apparatus used in this work, it has been found convenient to apply the active quaternary amine compound to the sugarcane field in the form of aqueous solutions, suspensions or emulsions having a concentration of active agent such that the application at the rate of from 7 to 20 gallons of liquid composition per acre will provide the required dosage of active chemical. However, the use of lower or higher gallonages may be preferred when a different dispensing mechanism is used.

The preferred carrier for the CTAB or similar active chemical is water to which about 0.1 to 2% by weight of surface active agent has been added. However, instead of using water as the carrier, non-phytotoxic mineral oils either as such or in the form of water-in-oil or oil-in-water emulsions may be used similarly in accordance with practices which are common in the art of treating vegetation with beneficial growth control agents.

DESCRIPTION OF SPECIFIC EMBODIMENTS

EXAMPLE I 0.5 g. of cetyltrimethylammonium bromide is dissolved in 4 ml water that contains as a surfactant about 0.25% (w./w.) nonylphenol which was ethoxylated to contain about 10.5 mols of ethylene oxide per mol of nonylphenol ("Tergitol NPX"). 0.6 ml of this solution is deposited or dropped by means of a syringe with a fine needle on the spindle area at the top or last visible dewlap of each of 20 stalks of sugarcane aged 19.6 months. (A dewlap is the junction between the blade of the leaf and the sheath which clasps the stalk). Ten of these stalks were harvested 4 weeks after such treatment and 10 more were harvested 5 weeks after such treatment. An equal number of stalks were treated in an identical manner with Trysben (dimethylamine salt of trichlorobenzoic acid), used as standard because of its consistent activity.

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarimetric determination and equals the percentage of sucrose if the latter is the only substance in the solution which will rotate the plane of polarized light. In any event, determination of the pol percent cane is a standard and effective method for determining the sucrose content of sugarcane. The results are given below:

|  | Four Weeks | | Five Weeks | |
| --- | --- | --- | --- | --- |
|  | Juice Purity | Pol Percent Cane | Juice Purity | Pol Percent Cane |
| Control (untreated) | 63.12 | 6.84 | 62.97 | 7.42 |
| Standard (Trysben) | 73.19 | 8.90 | 72.71 | 8.66 |
| CTAB | 77.77 | 10.99 | 79.28 | 11.98 |

As is apparent, the application of CTAB resulted in a very substantial improvement in both juice purity and pol percent cane.

EXAMPLE II

The procedure of Example I was repeated on stalks of sugarcane 21 months of age and the following results were obtained:

|  | Four Weeks | | Five Weeks | |
| --- | --- | --- | --- | --- |
|  | Juice Purity | Pol Percent Cane | Juice Purity | Pol Percent Cane |
| Control (untreated) | 72.18 | 9.12 | 76.07 | 11.54 |
| Standard (Trysben) | 84.15 | 13.86 | 80.68 | 12.24 |
| CTAB | 85.42 | 14.36 | 84.93 | 14.93 |

The results again show a distinct improvement in both sucrose yield and juice purity, resulting from treating the cane with an amine salt of the invention.

EXAMPLE III

The procedure of Example I was repeated on stalks 17.5 months of age. The following results were obtained:

|  | Four Weeks | | Five Weeks | |
| --- | --- | --- | --- | --- |
|  | Juice Purity | Pol Percent Cane | Juice Purity | Pol Percent Cane |
| Control (untreated) | 77.88 | 7.30 | 73.40 | 8.20 |
| Standard (Trysben) | 76.65 | 8.84 | 72.66 | 8.46 |
| CTAB | 83.21 | 11.51 | 81.09 | 10.71 |

A very apparent improvement in sucrose yield and juice purity results. Furthermore, the results of Examples I, II and III indicate that compounds of the invention are highly effective for the intended purpose relatively independently of the degree of ripeness which the cane has naturally reached at the time of the chemical treatment.

EXAMPLE IV

Example III is repeated applying lesser amounts of the solution of Example I to the stalks with the following results:

|  | Four Weeks | | Five Weeks | |
| --- | --- | --- | --- | --- |
| Amount Applied Per Stalk | Juice Purity | Pol Percent Cane | Juice Purity | Pol Percent Cane |
| 0.30 mls | 85.30 | 12.26 | 70.66 | 9.74 |
| 0.15 mls | 81.40 | 10.58 | 84.63 | 11.58 |

It may be noted that better results are obtained by applying 0.30 ml. 4 weeks prior to harvest, and that when application is made 5 weeks before harvest, better results are obtained by applying a lesser amount. Thus, it is apparent that the amount of salt applied may be varied within fairly broad limits, depending on the age of the cane and the amount of time between application and harvest.

EXAMPLE V

The following example shows the improvement obtained in sucrose yield when another of the desirable quaternary ammonium salts, namely dodecyltrimethylammonium (DTAB) is used. As s comparison, the results obtained with the use of CTAB and Cycocel (see U. S. Pat. No. 3,493,361) are set forth. Following the procedure of Example I, the results shown below are obtained:

|  | Four Weeks After Application | | Five Weeks After Application | |
| --- | --- | --- | --- | --- |
|  | Juice Purity | Pol Percent Cane | Juice Purity | Pol Percent Cane |
| Control (untreated) | 80.99 | 10.62 | 82.88 | 11.18 |
| Cycocel | 83.36 | 12.03 | 84.05 | 12.69 |
| CTAB | 85.80 | 12.33 | 86.13 | 14.63 |
| DTAB | 88.17 | 13.96 | 87.73 | 13.14 |

The table clearly shows the excellent results obtained with the application of dodecyltrimethylammonium bromide both for 4 weeks and 5 weeks prior to harvest.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of field grown, ripening sugarcane which comprises applying to the cane at a time at least about 2 weeks and up to about nine weeks prior to harvest a quaternary amine salt corresponding to the formula

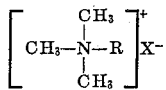

wherein R is alkyl of from eight to 20 carbon atoms and wherein X is chlorine or bromine, said salt being applied to the cane at a rate corresponding to from about 1 to about 10 pounds of salt per acre.

2. A process according to claim 1 wherein the salt is cetyltrimethylammonium bromide.

3. A process according to claim 1 wherein the salt is dodecyltrimethylammonium bromide.

4. A process according to claim 1 wherein the salt is applied to the cane in admixture with water as a carrier.

5. A process according to claim 1 wherein the salt is applied to the cane in the form of an aqueous solution or suspension at the rate of about 5 to 10 gallons of aqueous composition per acre.

6. A process according to claim 5 wherein the aqueous composition contains between 0.1 and 2% by weight of nonionic surface active agent.

* * * * *